May 23, 1967

C. H. SMALE 3,320,976

TWO-WAY VALVE

Filed Feb. 18, 1965

INVENTOR.
Charles H. Smale
BY
Paul Fitzpatrick
ATTORNEY

3,320,976
TWO-WAY VALVE

Charles H. Smale, Indianapolis, Ind., assignor to General Motors Corporation, Detroit, Mich., a corporation of Delaware
Filed Feb. 18, 1965, Ser. No. 433,562
4 Claims. (Cl. 137—625.44)

My invention relates to a valve which may be operated to close off either of two outlets from a chamber and which is particularly adapted to variably throttle flow through one of the outlets.

The principal object of my invention is to provide a valve which is particularly adapted to control large volumes of hot gas and which is of simple and reliable structure. One application of such a valve is to a gas turbine power plant including a regenerator or recuperator by which heat may be transferred from the turbine exhaust gas to the compressed air delivered by the compressor. In such an installation, the valve may close off a direct exhaust to cause all the turbine discharge gas to flow through the heat exchanger or it may open variably to bypass the heat exchanger to some extent; and it may move to shut off the duct to the heat exchanger and cause all of the exhaust gas to flow directly to atmosphere. In view of the high temperature of the gas turbine exhaust and the relatively large volume of flow, a valve to perform these functions satisfactorily is not easy to achieve. However, it will be apparent to those skilled in the art from the succeeding detailed description of the preferred embodiment of my invention that it is particularly adapted to operate satisfactorily in the stated environment or in others presenting similar problems.

Referring to the drawings.

Figure 1:
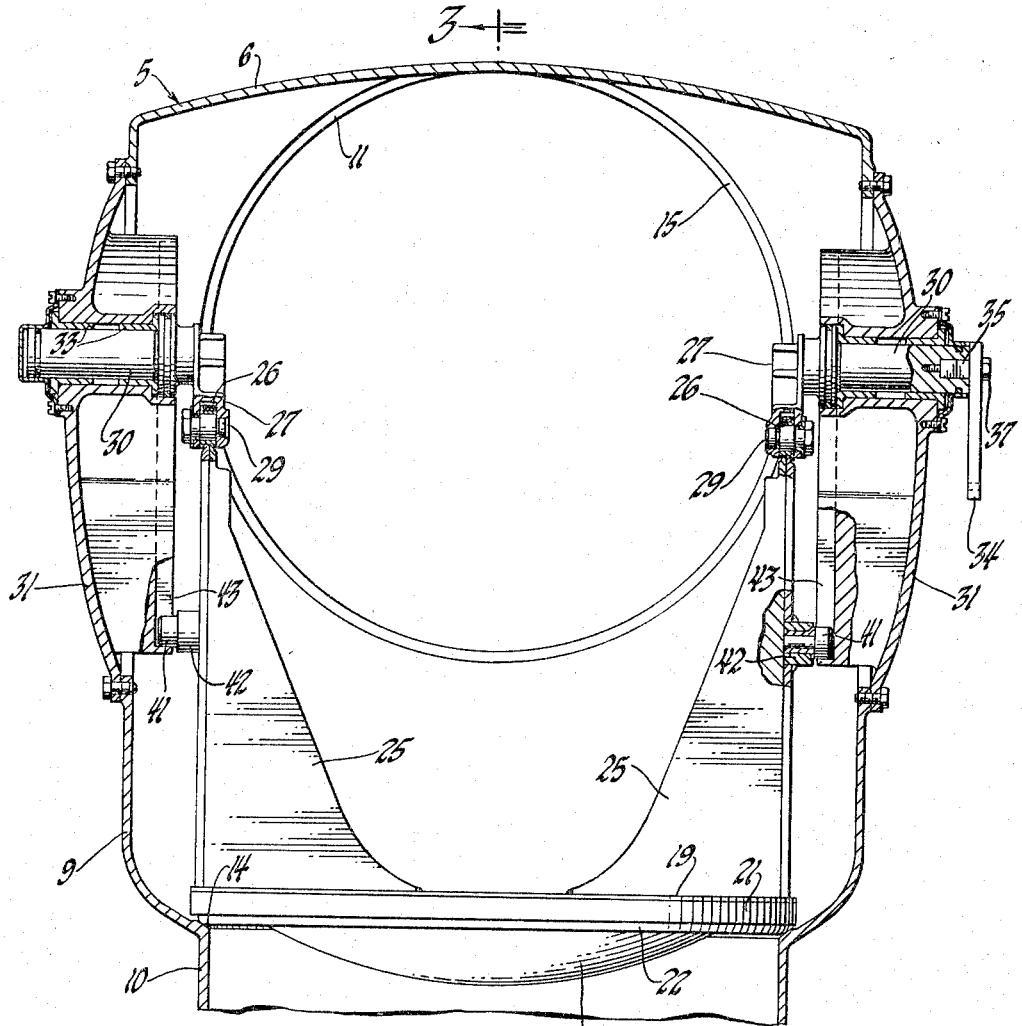
FIGURE 1 is a sectional view of a valve embodying the invention, taken principally on the planes indicated by the line 1—1 in FIGURE 3.

The valve comprises a body indicated generally as 5 made up of two principal structural parts. One is an inlet section 6 which defines the turbine exhaust gas inlet 7. The other principal part of the valve body is the outlet section 9 which defines a first circular outlet through a duct 10 and a second circular outlet through a duct 11. As shown, the inlet 7 and outlet 11 are coaxial and the outlet 10 at right angles to them, although this relation is not critical. The two body sections 6 and 9 are fixed together along a split line 13 by bolts passing through upstanding flanges on these parts.

Figure 2:
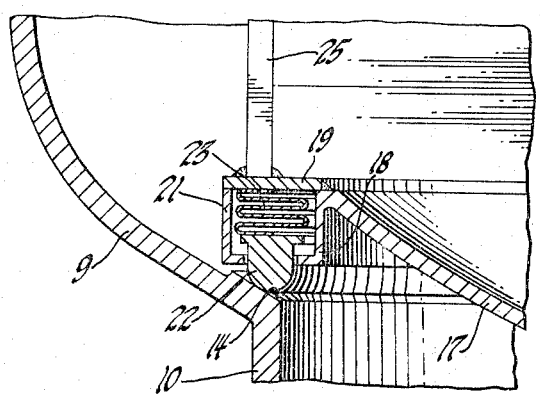
FIGURE 2 is a partial sectional view taken on the same plane as FIGURE 1 and to a larger scale.

In the application referred to, the outlet 10 is to a direct atmospheric exhaust and the outlet 11 is to a heat exchanger from which the exhaust gases would ultimately pass to atmosphere. The body defines a first annular valve seat 14 at the outlet 10 and a second annular seat 15 at the outlet 11. One or the other of these seats may be closed by a valve disk 17 which preferably is dished or bulged as illustrated. The disk 17 has a peripheral flange 18 (FIGURE 2). Flange 18, a ring 19 welded to the valve disk, and a depending flanged ring 21 define an annular recess within which is mounted a seat engaging ring 22 which is resiliently mounted on the disk 17 by a metal bellows 23.

The valve disk 17 is guided and moved into engagement with the seats 14 and 15 by stem means defined by two brackets 25 extending upwardly, as illustrated, from the disk 17 and welded to the ring 19. As will be clear from FIGURES 1 and 3, these brackets are part-cylindrical in configuration and taper upwardly. Each terminates in an eye 26 disposed in a clevis of an operating crank arm 27 to which it is coupled by a pivot pin 29. The arms 27 are integral with shafts 30 journaled for rotation in side cover plates 31 of generally circular outline. These cover plates are bolted to the sides of the body portions 6 and 9. Specifically, each shaft 30 is journaled in bushings 33 fitted in a boss of the cover 31. The valve disk 17 is moved by rotation of the shafts 30, one or both of which may be actuated by any suitable manual or power device. An actuating arm 34 mounted on the right-hand shaft 30 is adapted to be coupled to any suitable power actuator. This arm has a squared boss 35 fitted in a socket in the end of shaft 30 and retained by a machine screw 37.

Figure 3:
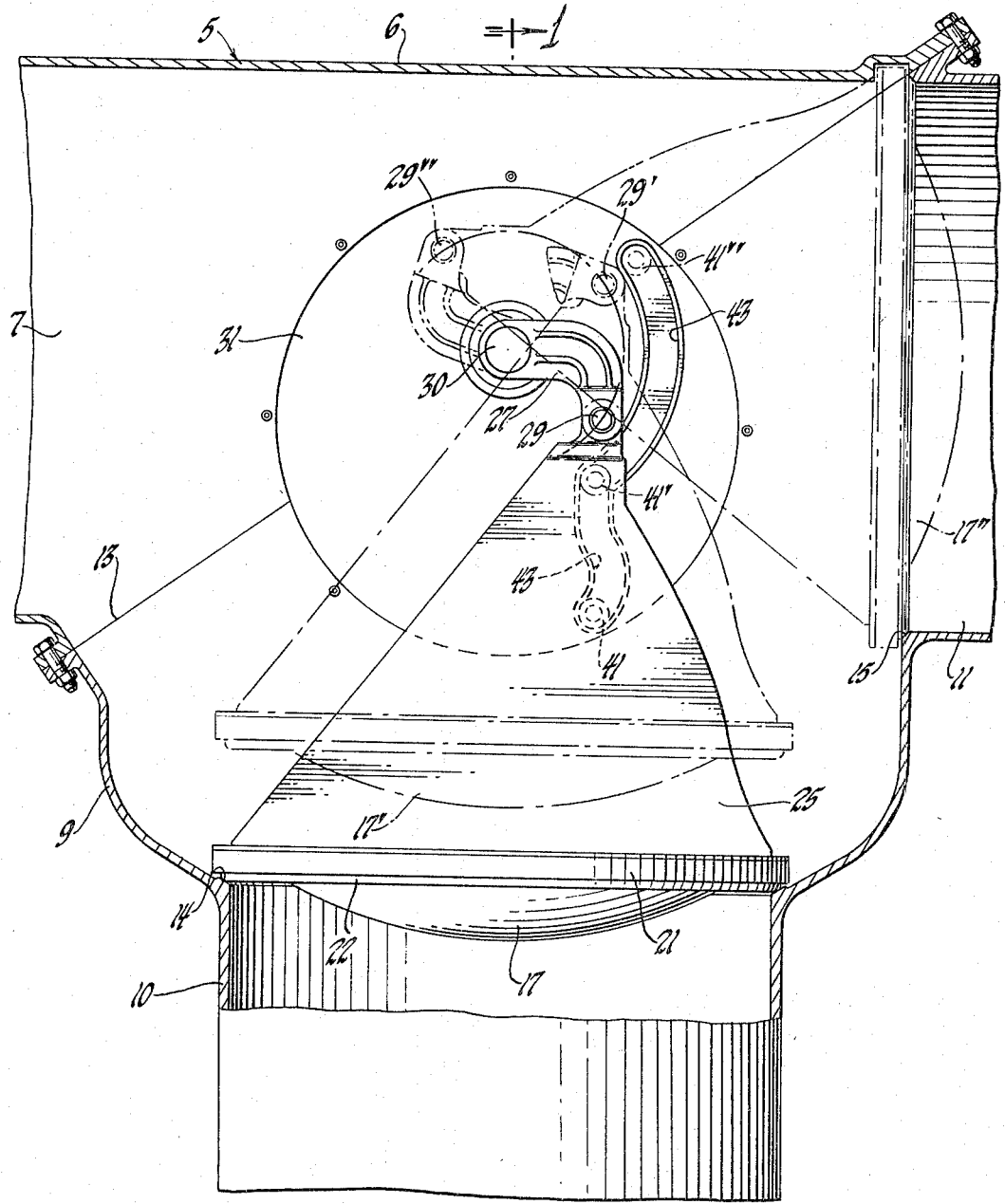
FIGURE 3 is a sectional view taken on the plane indicated by the line 3—3 in FIGURE 1.

The movement of the disk also is controlled by guide means between the brackets 25 and the body of the valve. In its preferred form the guide means comprises a cam follower roller 41 rotatably mounted on a boss 42 extending from the bracket 25. It also comprises a cam track or guide slot 43 machined in the inner face of each cover 31. As shown in FIGURE 3, the lower portion of slot 43 is generally perpendicular to seat 14. The upper portion is a circular arc centered on the axis of shafts 30, which axis is parallel to the planes of the valve seats. Starting with the valve closed on the seat 14 as illustrated in solid lines in FIGURE 3, as the shaft 30 is turned counterclockwise the pivot pin 29 moves to the broken line position 29', the follower 41 moves to the broken line position 41', and the valve disk moves to the broken line position 17'. This is accomplished during the travel of the roller 41 through the first portion of the guide slot. Further rotation of shaft 30 moves both the pin 29 and follower 41 in arcs around the axis of the shaft, and the valve disk and stem are also rotated about this axis so that the valve disk moves to the position 17", the pin 41 to the position 41" and the pin 29 to the pin position 29". During the first stage of movement, the opening to outlet 10 is gradually and progressively opened and an increasing proportion of the gas flows around the margin of the disk 17 through outlet 10. Meanwhile, a proportion of the gas would continue to flow through outlet 11, the exact ratio being dependent upon the resistance to flow in the regenerator and the position of the valve disk. During the second phase of movement, the disk 17 is swung as a rotating gate valve over the outlet 11 to block it completely and leave the outlet 10 completely unobstructed. The dome configuration of the disk improves its efficiency as a turning surface to turn the flow through 90° when the valve is closed at 15. Conceivably, the outlet 11 could be partially closed by leaving the disk 17 in an intermediate position, but this would not promote efficient flow through the outlet 11.

The valve may be actuated by movement of one of the shafts 30 with the other shaft following through movement of the valve disk, or both shafts may be driven. If desired, a cross-shaft extending through the center of the valve from and connecting the shafts 30 could also be provided, but it is not considered desirable to provide an obstruction to flow in this area.

It will be seen from the foregoing that the valve structure embodying the invention provides a very simple and rugged structure for gradually opening one outlet and then closing a second outlet.

The terms "inlet" and "outlet" are used herein for clarity of description and not in a limiting sense. Obviously, the valve structure could be employed with any one or two of ports 7, 10, and 11 as inlets and the remaining one or two as outlets.

The detailed description of the preferred embodiment of the invention to illustrate the principles thereof is not to be regarded as limiting the invention, since many modifications may be made by the exercise of skill in the art.

I claim:
1. A two-way valve comprising, in combination, a body having an inlet and two outlets; a valve seat at each outlet; a valve disk movable to cooperate alternatively with the seats; and means for moving the disk so as to move axially as a poppet valve to and from engagement with one of the seats and to move transversely as a gate valve to and from engagement with the other seat.

2. A two-way valve comprising, in combination, a body having an inlet and two outlets; a valve seat at each outlet; a valve disk movable to cooperate alternatively with the seats; and means for moving the disk so as to move axially as a poppet valve to and from engagement with one of the seats and to move transversely as a gate valve to and from engagement with the other seat; the moving means comprising stem means on the valve disk; a crank arm pivoted to the stem means; means to rotate the crank arm about an axis generally parallel to the planes of the seats; and cooperating guide means on the body and on the stem means between the crank arm and the disk to guide the stem means as it is moved by the crank arm so that the disk moves substantially linearly away from the said one seat and then rotates about the said axis to engage the other seat.

3. A two-way valve comprising, in combination, a body having an inlet and two outlets; a valve seat at each outlet; a valve disk movable to cooperate alternately with the seats; and means for moving the disk so as to move axially as a poppet valve to and from engagement with one of the seats and to move transversely as a gate walve of the seats and to move transversely as a gate walve to and from engagement with other seat; the moving means comprising two stem means extending from the valve disk; two crank arms pivoted respectively to the stem means; means to rotate the crank arms about an axis generally parallel to the planes of the seats; and cooperating guide means on the body and on each stem means between the crank arm and the disk to guide the disk as it is moved by the crank arms so that the disk moves substantially linearly away from the said one seat and then rotates about the said axis to engage the other seat.

4. A two-way valve comprising, in combination, a body having an inlet and two outlets; a valve seat at each outlet; a valve disk movable to cooperate alternatively with the seats. and means for moving the disk so as to move axially as a poppet valve to and from engagement with one of the seats and to move transversely as a gate valve to and from engagement with the other seat; the moving means comprising stem means on the valve disk; a crank arm pivoted to the stem means; means to rotate the crank arm about an axis generally parallel to the planes of the seats; and cooperating guide means comprising a cam track on the body and a cam follower on the stem means between the crank arm and the disk to guide the disk as it is moved by the crank arm so that the disk moves substantially linearly away from the said one seat and then rotates about the said axis to engage the other seat.

References Cited by the Examiner

UNITED STATES PATENTS

| | | | |
|---|---|---|---|
| 1,595,038 | 8/1926 | Vencl et al. | 251—158 |
| 2,530,295 | 11/1950 | Fantz | 137—625.44 |

FOREIGN PATENTS

| | | |
|---|---|---|
| 1,140,788 | 12/1962 | Germany. |
| 134,312 | 1/1952 | Sweden. |

M. CARY NELSON, *Primary Examiner.*

E. K. FEIN, *Assistant Examiner.*